United States Patent [19]

Eckstein et al.

[11] Patent Number: 4,595,434
[45] Date of Patent: Jun. 17, 1986

[54] COLLAPSIBLE DISPENSING TUBE WITH AN ORIFICE SEALED WITH MULTI-LAYER SEALANT SHEET MATERIAL

[75] Inventors: John P. Eckstein, Neenah, Wis.; William S. Gillespie, Barrington, Ill.; Suzanne E. Schaefer, Neenah, Wis.

[73] Assignee: American Can Company, Greenwich, Conn.

[21] Appl. No.: 532,440

[22] Filed: Sep. 15, 1983

[51] Int. Cl.[4] ............................................. B29C 27/00
[52] U.S. Cl. ...................................... 156/69; 222/81; 215/232
[58] Field of Search .................. 222/91, 81, 86, 92, 222/107, 153, 541; 215/232; 156/275.1, 272.2, 69; 425/809

[56] References Cited

U.S. PATENT DOCUMENTS

| | | | |
|---|---|---|---|
| 2,592,806 | 4/1952 | Jeffery | 222/81 |
| 2,671,577 | 3/1954 | Remington et al. | 222/541 |
| 2,976,224 | 8/1976 | Ericson et al. | 222/107 |
| 2,982,457 | 5/1961 | D'Alelio | 156/69 |
| 3,791,906 | 2/1974 | Farkas | 156/275.1 |
| 4,442,129 | 4/1984 | Niwa et al. | 215/232 |

FOREIGN PATENT DOCUMENTS 901376 6/1963 France ................................ 222/541

*Primary Examiner*—Joseph J. Rolla
*Assistant Examiner*—Kenneth Noland
*Attorney, Agent, or Firm*—Stuart S. Bowie; Douglas W. Wyatt

[57] ABSTRACT

A collapsible dispensing tube has a multi-layer sheet material sealed over its dispensing orifice to provide a hermetically sealed tube. The multi-layer sealant sheet comprises two layers of metal foil separated by a polymer layer firmly adhered to the metal foil layers. A polymeric layer is adhered to the outer surface of one of the metal foil layers and serves to seal the tube orifice. The laminated sheet may be sealed across the orifice by the application of radio-frequency energy.

4 Claims, 10 Drawing Figures

COLLAPSIBLE DISPENSING TUBE WITH AN ORIFICE SEALED WITH MULTI-LAYER SEALANT SHEET MATERIAL

FIELD OF THE INVENTION

This invention relates generally to collapsible dispensing containers and is particularly related to such containers which are hermetically sealed. In one aspect of the invention, the dispensing orifice of the container is sealed with a pierceable laminated sheet, and in another aspect, the laminated sheet is sealed to the orifice by radio-frequency heating.

BACKGROUND OF THE INVENTION

Metal dispensing tubes have a thin metal diaphragm sealing the dispensing orifice. This metal foil, which was often made integral with the metal tube, is generally known within the trade as a "blind head". Typically, the metal tube will have a closure cap on it, the cap having a pointed means for piercing the blind head in order to dispense the contained product from the tube.

While metal tubes have been used commercially for a long period of time, more recently, attention and interest have been focused on plastic and laminated containers. Plastic and laminated tubes are usually less costly than metal tubes and are less susceptible to chemical attack by certain products. Also, where the user desires to roll up the closed end of the tube, metal tubes tend to fracture with fewer rollings than do the laminated tubes.

Because of these superior performance characteristics of plastic and laminated tubes, these tubes today hold a large share of the tube market. One disadvantage of these tubes, however, is that they typically are closed on the dispensing end only by a plastic screw-on cap. So far as it is known, there is no known use of any hermetic seal on the dispensing end of the plastic or laminated tubes. The lack of a hermetic seal presents a number of problems which depend somewhat on the types of products contained and their sensitivity to the problems presented by this closure. Some products are reactive with gases in the air, such as oxygen, and the normal gaseous infusion noticeably affects product life. Some products desirably packaged in a tube are rather liquidous, and are not adequately contained for longer term storage, such as in commercial inventory, by a closure which is a simple screw-on cap. There is also an increased level of concern regarding malicious tampering with, or contamination of, products which may be ingested, or dispensed on sensitive tissue. Such tampering is easily accomplished with unprotected tube containers by removing the tube cap, doing whatever tampering is contemplated, and then re-emplacing the cap. There is often no way of detecting such tampering.

The problem of sealing an orifice in a bottle-type container for food or pharmaceuticals has been handled by applying a sealant sheet material over the bottle opening before the cap is put on or during cap emplacement. Such sheet materials are sold by the 3M Company of St. Paul, Minn. as product numbers 75M, 456M, and 603. The structures of these products are as follows:

| Components | 75 M | 456 M | 603 |
| --- | --- | --- | --- |
| White pulpboard | .035" | None | None |
| Wax | .00045" | None | None |
| Aluminum Foil | .001 | .002" | .003" |
| Adhesive | | negligible thickness | |
| Heat Sealable Polyester Film | .002" | .00045" | .002" |

These sheet materials are intended to be torn off the bottle and disposed of when the bottle is first opened. When these materials were tested, they were all found too difficult to pierce, and all did significantly impede dispensing of the product, by restricting the functional size of the orifice.

A typical plastic laminated material which is subjected to dead-folding, and is used as the body of a tube sidewall, is disclosed in U.S. Pat. No. 3,505,153 to Haas et al. The tube sidewall is, of course, intended to resist piercing, and therefore this patent is not concerned with a pierceable sealant sheet material.

Another plastic laminated material which is subjected to dead-folding is disclosed in U.S. Pat. No. 3,976,224 to Ericson et al. Again, the disclosed structures are intended to be used as tube sidewalls and are resistant to piercing.

Accordingly, it is an object of this invention to provide a collapsible dispensing tube with a hermetically sealed orifice.

It is a further object of this invention to provide a collapsible dispensing tube having its orifice hermetically sealed with a laminated plastic sheet.

It is also an object of this invention to seal the orifice of such collapsible dispensing tube by a laminated plastic sheet by heat sealing or by the application of radio-frequency heating.

It is a further object of this invention to provide a container with readily pierceable orifice seal wherein the pierced seal does not interfere with dispensing of the product from the container.

It is yet another object of this invention to provide such hermetically sealed containers which are tamper-indicative and which could afford the consumer a ready visual means of detecting if the container contents have been tampered with.

The foregoing and other objects, features and advantages of this invention will be more clearly comprehended from the following detailed description and the accompanying drawings.

SUMMARY OF THE INVENTION

It has been found that a collapsible dispensing tube can be hermetically sealed by sealing its orifice with a unique multilayer laminate structure. Surprisingly, when this laminated sheet is pierced, the laminated sheet is displaced interiorly of the orifice and will conform to the interior surface thereof because of the excellent deadfold retention characteristic of the sheet. Therefore, the contained product may be dispensed from the tube without obstruction or interference from the interiorly displaced laminated sheet.

The special sheet material desirably has a minimum overall thickness of about 5.0 mils to ensure good deadfold retention. A practical, though not absolute, maximum overall thickness is about 8.0 mils. Within the range of 5.0 to 8.0 mils thickness, the special sheet materials of this invention function well. At thicknesses over 8.0 mils, the sheet materials encounter interference with standard closure caps, requiring special cap redesign.

Also, the thicker sheet materials are more difficult to puncture. Nevertheless, sheet materials over 8.0 mils thick can be used where these limitations are properly provided for.

The invention is typified by a collapsible dispensing tube including a headpiece having a dispensing orifice therein and a body extending from the headpiece. The specific multiple layer sheet material is sealed over the orifice opening. The sheet material has first and second outer surface layers and is sealed to the headpiece orifice by the first outer layer, which is a sealant layer, and extends across and closes, the orifice. The sheet material has first and second layers of metal foil and a third layer of polymer disposed between the first and second layers of metal foil and firmly adhered thereto. A fourth layer, of polymer, is outside the composite structure of the first, second and third layers, and is firmly adhered to the first layer, the fourth layer comprising the above-mentioned first outer surface sealant layer of the sheet material, and being the functional means of keeping the specific sheet material adhered to the headpiece and over the orifice opening. The second outer surface layer is the second layer of metal foil.

In another embodiment of the invention, a fifth layer of polymer, is disposed on the outer surface of the fourth layer and functions as the first outer layer of the sheet material. Also, in a different embodiment of the invention, additional polymer layers may be disposed between the first and second foil layers. In still another embodiment of this invention, it is advantageous to include both the fifth layer on the outer surface of the fourth layer, and additional polymer layers between the first and second foil layers.

For ease of functioning and use of the tubes of the invention, the tubes are desirably capped with a cap designed with a piercing means which can, concurrently with piercing the seal, fold the pierced sheet against the interior wall of the dispensing orifice. While certain conventional caps are more efficient for piercing and folding than others, the design of the cap piercing means is generally not critical. Suitable caps may be selected from standard designs currently available from suppliers.

Sealing of the orifice by the laminated sheet may be effected by heat sealing or, as will be more fully described hereafter, by the application of radio-frequency heating.

DETAILED DESCRIPTION OF THE PREFERRED EMBODIMENTS

Figure 1:
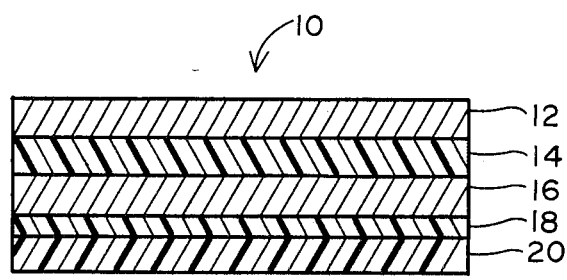
FIG. 1 is a cross-section of a multi-layer sheet material of this invention.
Figure 6:
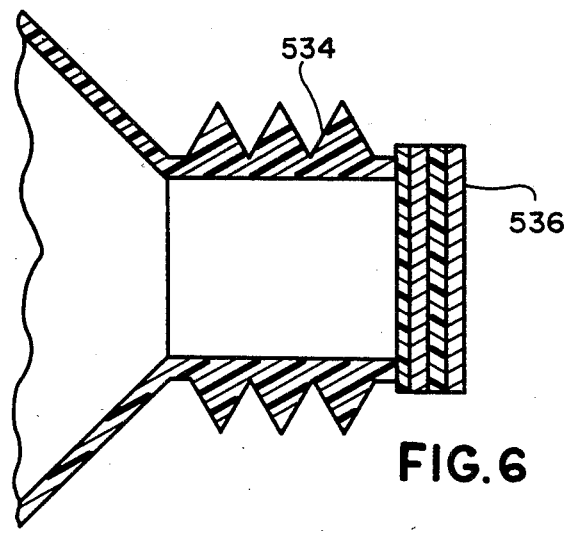
FIG. 6 is an enlarged cross-section of the orifice area of a tube of this invention with a representative sealant sheet material sealed over the orifice.

Turning now to the drawings, the special sheet material shown in FIG. 1 is generally designated by the numeral 10. Layers 12 and 16 are metal foil. Layers 14 and 20 are polymer layers, and preferably ethylene polymers or copolymers. Layer 20 serves as the sealant layer to the headpiece of the tube, as shown in FIG. 6. Layer 18 is a primer, and is shown as a layer for illustration purposes only, since it is usually so thin as to have negligible thickness, as are the primer layers shown in FIGS. 2, 3, and 4.

Figure 2:
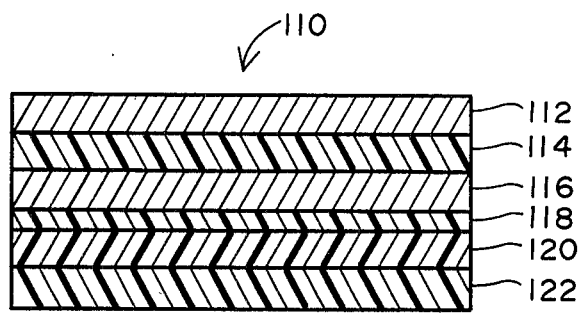
FIG. 2 is a cross-section of an alternate sheet material of this invention.

The multi-layer sheet structure in FIG. 2 is generally designated as 110 and includes the layers 112 and 116 which are metal foil. Layers 114 and 120 are polymer layers, and preferably ethylene polymers or copolymers. Layer 118 is a primer. Layer 122 is an additional polymer layer especially selected for good adhesion to layer 120 and, as the sealant layer, for good adhesion to the headpiece of the tube.

Figure 3:
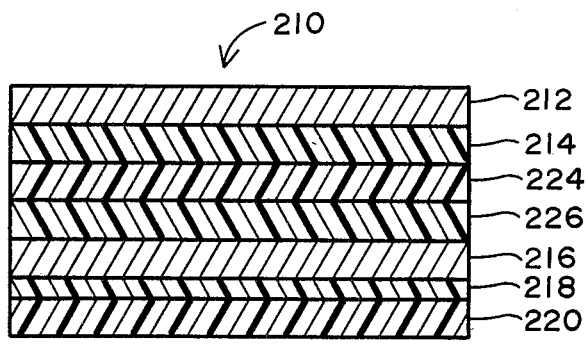
FIG. 3 is a cross-section of still another sheet material of this invention.

FIG. 3 illustrates a multi-layer laminate generally designated 210. Layers 212 and 216 are metal foil. Layer 218 is a primer. Layer 220 is a polymer layer. Polymer layers 214, 224, and 226 together perform a function similar to that of layer 14 in FIG. 1.

Figure 4:
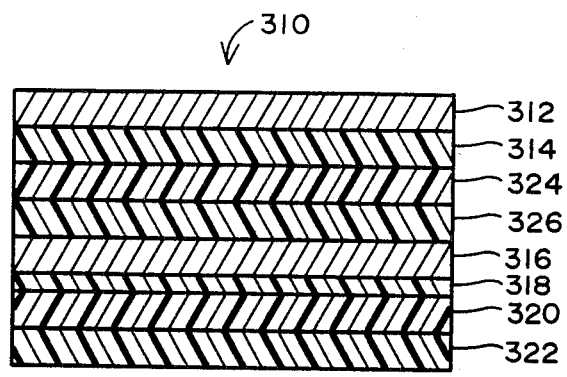
FIG. 4 is a cross-section of yet another sheet material of this invention.

The laminated sheet in FIG. 4 is generally designated as 310 and includes metal foil layers 312 and 316. Layers 314, 324, and 326 are polymer layers similar to layers 214, 224 and 226 in FIG. 3. Layer 318 is a primer. Layers 320 and 322 are polymer layers similar to layers 120 and 122 in FIG. 2.

Figure 5:
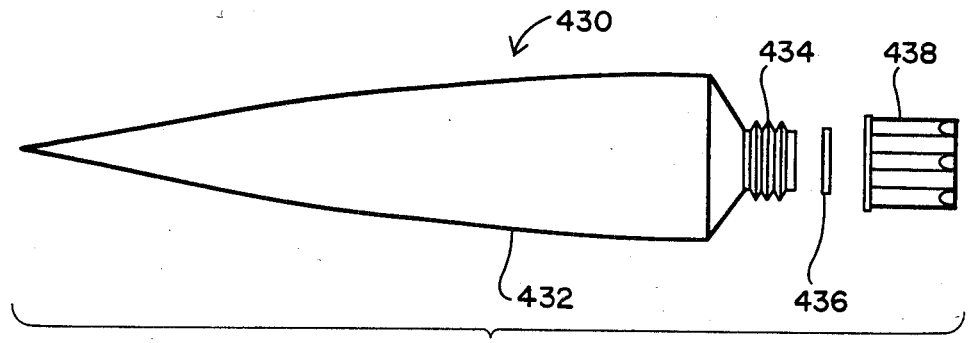
FIG. 5 is a pictorial view of a dispensing tube of this invention, with the sealant sheet material and the cap displaced to show their proper orientations and positions.

FIG. 5 is a pictorial view of a tube 430 having a main body portion 432, a headpiece 434, a laminated sealant sheet material 436 over the orifice in the headpiece, and a cap 438. Cap 438 and seal 436 are shown displaced from the tube for illustration purposes.

In FIG. 6, a portion of the headpiece of a tube such as in FIG. 5, is shown in enlarged cross-section with the special sheet material 536 shown sealed to the headpiece 534 over the dispensing orifice.

Figure 7:
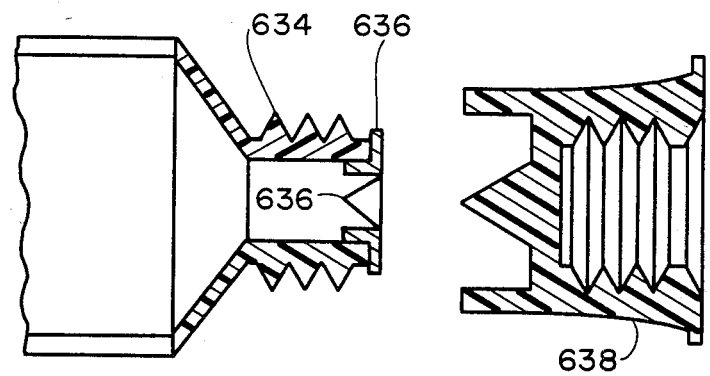
FIG. 7 is an enlarged cross-section of the orifice area, and of a cap, of a tube of this invention wherein the sealant sheet material has been pierced and folded back against the interior of the dispensing orifice.

In FIG. 7, a portion of the headpiece 634, such as in FIGS. 5 and 6 is shown in enlarged cross-section, with the laminated sealant sheet material 636 having been punctured by the cap 638 and folded back against the interior of the dispensing orifice.

Figure 8:
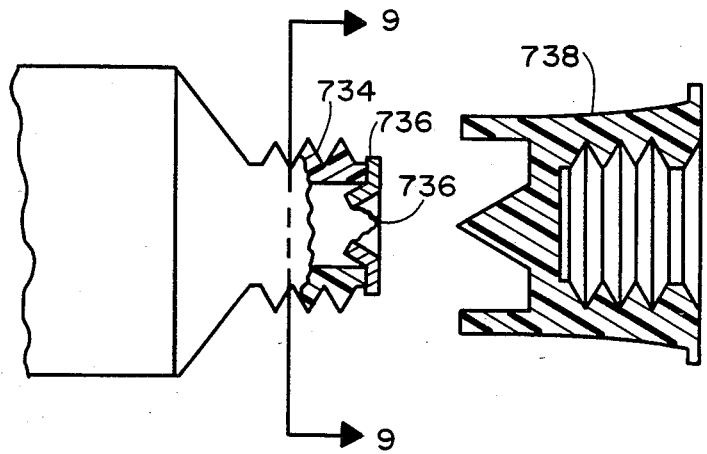
FIG. 8 is an enlarged, partially cut-away cross section of the orifice area, and a cap, of a tube not of this invention, and wherein the sealant sheet material has not retained a good deadfold against the interior of the dispensing orifice.

FIG. 8 is similar to FIG. 7 except that laminated sealant sheet material 736 which is sealed to headpiece 734, and has been punctured by cap 738, is representative of sheet materials which do not puncture cleanly, or do not retain a deadfold against the dispensing orifice, or both. In any of those cases, sheet material 736, or a portion of it, projects into the orifice and away from the sidewall.

Figure 9:
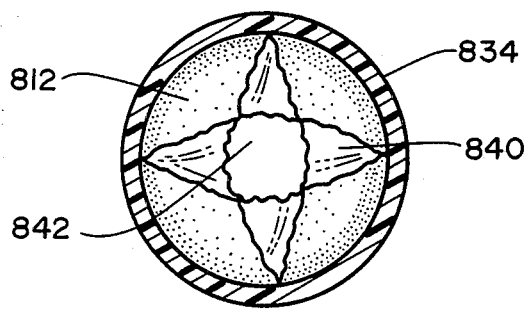
FIG. 9 is taken at 9—9 of FIG. 8 and shows, from the interior of the tube, the partial blockage of the orifice by the pierced laminated sheet material.

FIG. 9 shows the dispensing orifice of FIG. 8 as seen from inside the tube. The orifice defined by the headpiece is the circular structure designated 834. In the punctured sheet structure, the foil segments are shown with stippling and are designated 812. This foil segment is covered by the polymer sealant. Between the foil segments 812 are seen portions 840 of the polymer layers which have stretched, rather than tearing as desired. Hole 842 is, then, the functional orifice initially useful for dispensing product. As the tube is squeezed to dispense product, the product initially travels along the orifice defined by the headpiece 834. As the leading edge of the product reaches the sheet structure, the central portion of it exits through the functional orifice 842. The remainder of the leading edge of the product encounters the sheet structure and pushes against it, moving the central portions of the sheet material outwardly of the loci shown in FIG. 8, and further restricting the functional dispensing orifice. FIGS. 8 and 9 thus represent structure combination which is not within the scope of the invention.

In order to meet the performance parameters required by the functions herein described, it is crucial that the sheet material meet certain criteria. First, it is essential that all the layers be joined together with good adhesion. Lacking good adhesion, particularly adhesion between the foil layers and the polymer layers, and even though the sheet structure may otherwise be within the structural parameters taught herein, the polymer layers tend to stretch rather than puncture. The thus stretched layers tend to return to their original shape, after the puncture attempt, thus obstructing the orifice, as shown in FIG. 9. With good adhesion, especially to the foil layers, the puncturing of the foil controls, to a significant extent, the puncturing and folding of the polymer layers, and the retention of the folds against the inner surface of the dispensing orifice.

Second it is essential that the outer layer on one surface of the sheet material be sealable to the tube headpiece, such as to headpiece 534 in FIG. 6. This outer layer is represented by layers 20, 122, 220, and 322 in FIGS. 1-4.

Thirdly, it is further essential that the second outer layer on the other surface of the sheet material be a metal foil layer. This second outer layer is represented by layers 12, 112, 212, and 312, in FIGS. 1-4.

Fourthly, it is also essential that the sheet materials used herein must have two layers of metal foil separated by at least one polymer layer. Foil as a layer serves as an effective barrier to gaseous transmission. In specifying two layers of metal foil, two desirable functions are accomplished. The first desirable function is that the two layers provide good deadfold of the sheet material with less total foil thickness than is required for a structure using a single foil layer. And indeed some structures using a single foil layer can be used to seal the orifice of a tube and do retain the required deadfold after puncturing, but they use an excessive amount of the expensive metal foil and are difficult to puncture. For example a 2-layer structure using a single 5.0 mil layer of foil and 1.0 mil of EAA as a polymer sealant layer provides good barrier and good deadfold retention, but it is too difficult to puncture and is excessively costly. As will be seen hereinafter, in the sheet materials of this invention, the sum of the thicknesses of the two foil layers can be as little as only 3.0-3.7 mils. Thus the amount of expensive foil used is reduced from the above iterated 5.0 mils of foil. In the second desirable function, surprisingly, the double foil layer is also easily punctured, even compared to a similar structure, but using a single 3.0 mil layer of foil. Such a similar structure, however, does not possess the necessary deadfold retention characteristics.

Referring now to the structure layers in particular, the two foil layers are preferably aluminum foil, although other metal foils are contemplated and may be used. The most desirable metal foils are aluminum foils having the highest purity, such as 1145 alloy. The best functional results are achieved with foil which has been fully annealed. Referring first to the structure of FIG. 1, it is seen that foil layer 12 is on one exterior surface of the sheet material, and foil layers 12 and 16 are separated by a polymer layer 14. For best efficiency of use of the strengths of the foil layers, the surface foil layer (i.e. layer 12) is advantageously thicker than the other foil layer, as the overall effect is easier puncturing of the sheet material. It is entirely acceptable, however, and within the scope of the invention, for both foils to be the same thickness, or for the outer foil to be thinner than the inner foil as illustrated in the EXAMPLES which follow.

The polymer layers in the structure are selected to serve their several functions, depending on the specific tube structure, and contemplated product. In a simple structure as in FIG. 1, a highly satisfactory polymer for both layers 14 and 20 is ethylene acrylic acid copolymer (EAA). EAA adheres well to foil, and has good chemical resistance to many products. Regarding adhesion to the interior foil layer as at 16 in FIG. 1, it is often desirable to use a primer, such as at layer 18, in adhering the foil layer to the next adjacent polymer layer, in FIG. 1 that layer being layer 20. The significance of primer 18 is that it enhances the interlayer bond between foil layer 16 and polymer layer 20, such that the bond has improved capability to withstand attack by chemical moieties in the product, which attack may otherwise weaken that bond such that the structure cannot be punctured as in FIG. 7, but punctures more like the unacceptable structure illustrated in FIGS. 8 and 9. A highly desirable primer is comprised of a chrome complexed polyacrylic acid polymer which is described in copending application Ser. No. 340,468 of common assignment herewith, and herein incorporated by reference. Wherever in this teaching a primer is suggested as being useful, the above chrome complex primer may be used. Other primers may also be used so long as they provide the desired interlayer adhesion.

In place of the EAA at either or both of layers 14 and 20, other polymers may be used so long as they have good interlayer adhesion within the sheet structure. Illustrative of polymers which may be used are low density polyethylene (LDPE), medium density polyethylene (MDPE), high density polyethylene (HDPE), linear low density polyethylene copolymer (LLDPE), ethylene methacrylic acid (EMAA), and ionomers. It is contemplated that the use of primer may be required at each layer interface where these other polymers are used adjacent the foil.

While EAA is highly satisfactory for both layers 14 and 20, there are some cases where better choices may be made. LDPE, for example is less costly than EAA. It is also less extensible, so that lower interlayer adhesion levels may be tolerated as desired for ease of processing in constructing the multiple layer sheet material. Other materials may likewise be selected. Functional adhesion remains essential.

For purposes of description herein, all the polymer layers adjacent a foil layer will be assumed to be EAA, it being understood that other materials can be used in place thereof as above described, so long as the functional requirements are preserved.

Comparing now the structure of FIG. 2 to that of FIG. 1, it is seen that FIG. 2 has an additional layer, namely layer 122. Layer 20 in FIG. 1 serves as an adhesive to foil layer 16, as the sealant layer to the headpiece of the tube and may serve as a chemical barrier protecting foil layer 16. While such simplicity of design is desirable, the multiplicity of functions imposed on the single layer 20 may require that certain functional comprises be made. By using the additional layer, as at 122 in FIG. 2, layer 122 may be selected, for example, for its desirable properties of better adhesion to the tube headpiece, and layer 120 need not have those properties so long as it has good adhesion to both layers 116 and 122. For example, in a typical tube contemplated by this invention, the tube headpiece as at 434 in FIG. 5 is HDPE. For good sealing of the sheet structure to the HDPE headpiece, it is advantageous that the surface polymer layer of the sheet structure be a polyethylene rather than an ethylene copolymer. Thus, for example, the composition of layers 122 and 322 in FIGS. 2 and 4 may be one of the polyethylenes such as LDPE, MDPE, or HDPE. Again the critical criteria are good adhesion to the adjacent polymer layer in the sheet structure and good adhesion to the headpiece. In some cases, where adequate interlayer adhesion is not achieved, it may indeed be desirable to interpose an adhesive layer, not shown, which may or may not be polymeric, between the surface layer (122 or 322) and the adjacent polymer layer (120 or 320 respectively), or to substitute an adhesive layer for layer 120 or 320.

Comparing now the structure of FIG. 3 to that of FIG. 1, it is seen that FIG. 3 has additional polymer layers between the two foil layers. Thus whereas, for example, EAA adheres well to foil, it may be more extensible than desired for the entire contemplated thickness of polymer between the two foil layers. It is also expensive. An alternative to the single layer of EAA as at 14 in FIG. 1, is to have two thinner layers, 214 and 226 which adhere well to foil and another layer 224 which adheres well to layers 214 and 226 while having preferred extensibility properties and improved cost performance.

Finally, the structure of FIG. 4 combines the desired functional improvements of the structures of FIGS. 2 and 3 into one structure. Those skilled in the art of multiple layer sheet structures will readily discern the trade-offs of the cost penalties of assembling the more complex structures against their improved performance characteristics and the reduced expense of the more economical layers.

It is contemplated that the thickness of the sheet structure will generally be independent of the number of layers in the structure.

The sheet structure of this invention may be assembled by well-known lamination techniques. For example, a structure as in FIG. 1 is made as follows. Two layers of aluminum foil are extrusion laminated together. Primer is then applied to the outer surface of one of the foil layers and dried. Finally the primed foil is extrusion coated with a polymer layer. The more complex structures are made by similar known processes, such as by coextrusion coating, coextrusion lamination and multiple pass extrusion processes. It is generally desired that the entire sheet structure, whatever its degree of complexity, be assembled in one in-line operation, in order to minimize adhesion loss due to contamination in the extra handling, winding up, and unwinding accompanying multiple pass operations.

EXAMPLE 1

Two layers of aluminum foil 3.0 mils and 0.7 mil thick, respectively, are extrusion laminated together using 1.3 mils of EAA as the extrusion laminant. The exposed surface of the 0.7 mil thick foil is then primed with chrome complex polyacrylic acid primer and dried. The primed foil is then coextrusion coated with 0.5 mil EAA and 0.5 mil LDPE, with the EAA being against the primed foil.

EXAMPLE 2

Two layers of aluminum foil 3.0 mils and 0.7 mil thick, respectively, are extrusion laminated together using 1.3 mils of EAA as the extrusion laminant. The exposed surface of the 3.0 mils thick foil is then primed with chrome complex polyacrylic acid primer and dried. The primed foil is extrusion coated with 1.0 mil EAA.

EXAMPLE 3

Two layers of aluminum foil, each 1.5 mils thick, are extrusion laminated together using 2.0 mils of EAA as the extrusion laminant. The exposed surface of one of the foils is then primed with chrome complex polyacrylic acid primer and dried. The primed foil is extrusion coated with 1.0 mil EAA.

EXAMPLE 4

Two layers of aluminum foil 3.0 mils and 0.7 mils thick, respectively, are extrusion laminated together using 1.3 mils of EAA as the extrusion laminant. The exposed surface of the 0.7 mil thick foil is then primed with chrome complex polyacrylic acid primer and dried. The primed foil is extrusion coated with 1.0 mil EAA.

The sheet structures herein described are applied to the headpiece, such as shown in FIG. 6, of conventional collapsible dispensing tubes. If desired, they could indeed be applied to metal tubes also. The polymer surface layer of the sheet structure is sealed to the headpiece, with the foil surface layer thus facing the environment outside the tube. Thus is the tube container made into a hermetically sealed container unit. The sheet material is generally protected from the outside environment by a cap such as cap 438 in FIG. 5. The cap may be emplaced either simultaneously with the sealed sheet material or may be emplaced in a later, and separate operation.

In the thus hermetically sealed tube, even with the cap removed, the contents are protected from external invasion, whether from gaseous permeation or from intentional or unintentional tampering. If the hermetic seal is compromised, the compromise may be detectable either by visual observation or by squeezing the supposedly sealed tube and observing the exuded product. Thus small holes, such as from a hypodermic needle or the like, may be detected.

The hermetic seal also prevents leakage of liquidous product.

When the contained product is to be used for the first time, the sheet material is punctured as shown in FIG. 7, by a puncturing means. As illustrated, and as most desirous, puncturing means is economically incorporated into the cap.

Once the sheet material is opened and folded back against the interior of the dispensing orifice, the tube functions as would any conventional tube which would not have the special sheet material herein described, such that product may be dispensed, and the cap emplaced as a closure pending further and intermittent dispensing of the product.

As it was previously mentioned, the tube orifice may be sealed with the laminated sheet by radio-frequency heating. Surprisingly, it has been found that radio-frequency heating in the manner herein described increases the radio-frequency energy transmitted to the seal and reduces the radio-frequency energy transmitted to the sidewall and the sideseam of the sidewall.

Figure 10:
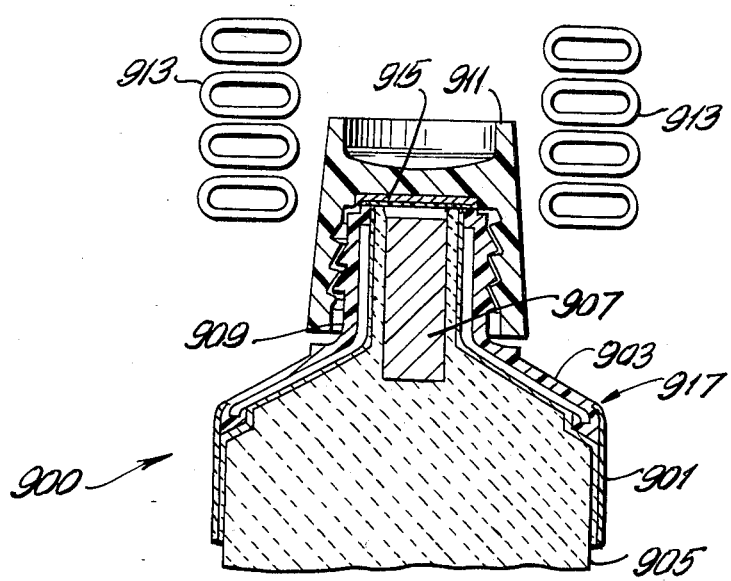
FIG. 10 is an elevational, partly sectional view illustrating the application of radio-frequency heating for sealing the laminated sheet material to the orifice of the container in accordance with this invention.

Thus referring to FIG. 10, there is shown a container generally designated as 900 having a sidewall 901 and a plastic head 903. The container is placed upon a nonmetallic working mandrel 905, and a ferrite cylinder 907 is disposed within the neck 909 of the container.

The container neck 909 is externally threaded for engagement with an internally threaded cap 911. The radio-frequency coil 913, energized from an external radio-frequency energy source (not shown), serves to seal the laminated sheet 915 across the container orifice to provide a hermitic seal.

While the container sidewall may have the usual known laminated structure, the application of radio-frequency heating to effect sealing of the orifice is most advantageous when the sidewall contains an aluminum foil. Also, the laminated sheet 915 may have any of the structure heretofore described in connection with FIGS. 1-4, and as was previously noted, includes two aluminum foil layers.

During heat sealing the orifice with a laminated sheet, it is important to avoid excessive heating of the aluminum foil layer at the end of the container sidewall 901. Otherwise, the excessive heat will degrade or destroy the head bond and the sideseam near the head as shown at 917. Surprisingly, it has been found that when ferrite is placed in the neck of the tube as shown in FIG. 10, the radio-frequency energy will seal the orifice to provide an effective hermetic seal without degrading or destroying the sidewall and the sideseam.

What is claimed is:

1. A method of hermetically sealing a collapsible dispensing tube, wherein the tube includes a headpiece having a dispensing orifice therein and a body extending from said headpiece, said method comprising placing said tube over a working mandrel, placing a generally cylindrical ferrite material in the neck portion of said headpiece in spaced relation to the interior of said neck portion and said orifice, placing a multiple layer sheet material across said dispensing orifice and apply radio frequency energy thereto to hermetically seal said orifice, said multiple layer sheet material comprising first and second layers of metal foil and a third layer of a polymer disposed between said first and second layers and firmly adhered thereto, and a fourth layer of polymer outside the composite structure of said first, second and third layers, and firmly adhered to said first layer, said fourth layer comprising said first outer surface layer of said sheet material and being the functional means of keeping said sheet material adhered to said headpiece.

2. A method as in claim 1 wherein said sheet material includes a fifth layer, of polymer, on the outer surface of said fourth layer, said fifth layer serving as said first outer surface layer of said sheet material.

3. A method as in claim 2 wherein additional polymer layers are disposed between said first and second foil layers.

4. A method as in claim 1 wherein additional polymer layers are disposed between said first and second foil layers.

* * * * *